(12) United States Patent
Morton et al.

(10) Patent No.: US 7,533,500 B2
(45) Date of Patent: May 19, 2009

(54) DECK PLANK AND METHOD OF PRODUCTION

(75) Inventors: Philip G. Morton, Germantown, OH (US); David A. Stammen, Dayton, OH (US); Todd J. Hamilton, Middletown, OH (US); Scott A. Ricke, Trenton, OH (US)

(73) Assignee: Deceuninck North America, LLC, Monroe, OH (US)

( * ) Notice: Subject to any disclaimer, the term of this patent is extended or adjusted under 35 U.S.C. 154(b) by 52 days.

(21) Appl. No.: 10/374,338

(22) Filed: Feb. 26, 2003

(65) Prior Publication Data

US 2004/0144056 A1    Jul. 29, 2004

Related U.S. Application Data

(63) Continuation-in-part of application No. 29/174,863, filed on Jan. 27, 2003, now Pat. No. Des. 485,373.

(51) Int. Cl.
  *E04F 15/12* (2006.01)
  *E04F 15/16* (2006.01)
(52) U.S. Cl. ............... 52/177; 52/181; 52/480; 52/586.1; 52/650.3; 52/585.1
(58) Field of Classification Search ............ 52/480, 52/177, 468, 181, 469, 472, 650.3, 586.1, 52/311.1, 738.1, 834, 364, 585.1
  See application file for complete search history.

(56) References Cited

U.S. PATENT DOCUMENTS

| | | | | |
|---|---|---|---|---|
| 1,714,738 A | * | 5/1929 | Smith | 52/512 |
| 1,723,306 A | * | 8/1929 | Sipe | 52/396.04 |
| 3,150,748 A | * | 9/1964 | Liskey, Jr. | 52/396.04 |
| 3,620,027 A | * | 11/1971 | Nordell | 405/219 |
| 3,992,839 A | * | 11/1976 | La Borde | 52/275 |
| 4,126,006 A | * | 11/1978 | Lewis | 405/220 |
| 4,557,091 A | * | 12/1985 | Auer | 52/282.3 |
| 4,879,151 A | * | 11/1989 | Ellingson, Jr. | 428/53 |
| 5,048,448 A | * | 9/1991 | Yoder | 114/263 |
| 5,054,253 A | * | 10/1991 | Bedics | 52/177 |
| 5,394,667 A | * | 3/1995 | Nystrom | 52/480 |
| 5,458,942 A | * | 10/1995 | Miller | 428/76 |
| 5,647,184 A | * | 7/1997 | Davis | 52/592.1 |
| 5,713,165 A | * | 2/1998 | Erwin | 52/181 |
| 5,896,717 A | * | 4/1999 | Gill | 52/586.2 |
| 5,941,027 A | * | 8/1999 | Hallsten | 52/64 |
| 5,950,377 A | * | 9/1999 | Yoder | 52/177 |
| 5,953,878 A | * | 9/1999 | Johnson | 52/582.2 |

(Continued)

FOREIGN PATENT DOCUMENTS

JP        6-101314      *  4/1994    ........... 52/177

*Primary Examiner*—Phi Dieu Tran A
(74) *Attorney, Agent, or Firm*—Jacox, Meckstroth & Jenkins

(57) ABSTRACT

A deck plank is co-extruded from an extrusion die which receives molten plastics materials supplied from three separate plastic extruders to provide the plank with opposite sides having different colors. Preferably, the base plank is extruded from a lower cost material such as reground scrap polyvinylchloride (PVC), and thin PVC cap layers are co-extruded on opposite sides of the base plank in different colors. Opposite edges of each plank have longitudinally extending grooves for receiving hidden fasteners in the form of screws extending through short flat tie pieces or a continuous sealing tie strip projecting into the opposing grooves of adjacent planks.

6 Claims, 2 Drawing Sheets

U.S. PATENT DOCUMENTS

| | | | | |
|---|---|---|---|---|
| 5,953,880 A * | 9/1999 | De Zen | ................ | 52/737.6 |
| 6,170,212 B1 * | 1/2001 | Suchyna et al. | ................ | 52/480 |
| 6,301,842 B1 * | 10/2001 | Chaney et al. | ................ | 52/177 |
| 6,314,699 B1 * | 11/2001 | West | ................ | 52/489.1 |
| 6,402,415 B1 * | 6/2002 | Eberle, III | ................ | 403/231 |
| 6,453,630 B1 * | 9/2002 | Buhrts et al. | ................ | 52/177 |
| 6,484,467 B2 * | 11/2002 | Crout | ................ | 52/483.1 |
| 6,513,297 B2 * | 2/2003 | Kloepfer | ................ | 52/588.1 |
| 6,594,961 B2 * | 7/2003 | Leines | ................ | 52/177 |
| 6,617,009 B1 * | 9/2003 | Chen et al. | ................ | 428/195.1 |
| 6,651,398 B2 * | 11/2003 | Gregori | ................ | 52/489.1 |
| D485,373 S * | 1/2004 | Morton et al. | ................ | D25/125 |
| 6,694,681 B1 * | 2/2004 | Andres | ................ | 52/177 |
| 6,711,864 B2 * | 3/2004 | Erwin | ................ | 52/582.1 |
| 6,739,106 B2 * | 5/2004 | Curatolo | ................ | 52/592.1 |
| 6,804,923 B1 * | 10/2004 | Potter | ................ | 52/480 |
| 6,865,855 B2 * | 3/2005 | Knauseder | ................ | 52/592.1 |
| 6,871,467 B2 * | 3/2005 | Hafner | ................ | 52/586.1 |
| 6,986,934 B2 * | 1/2006 | Chen et al. | ................ | 428/195.1 |
| 7,073,303 B2 * | 7/2006 | Baker | ................ | 52/586.1 |
| 2001/0022056 A1 * | 9/2001 | Gifford | ................ | 52/311.1 |
| 2002/0056238 A1 * | 5/2002 | Leines | ................ | 52/177 |
| 2003/0009973 A1 * | 1/2003 | Lee | ................ | 52/589.1 |
| 2003/0140581 A1 * | 7/2003 | Ludington | ................ | 52/177 |
| 2003/0154662 A1 * | 8/2003 | Bruchu et al. | ................ | 52/87 |
| 2004/0020136 A1 * | 2/2004 | Hauck | ................ | 52/11 |

\* cited by examiner

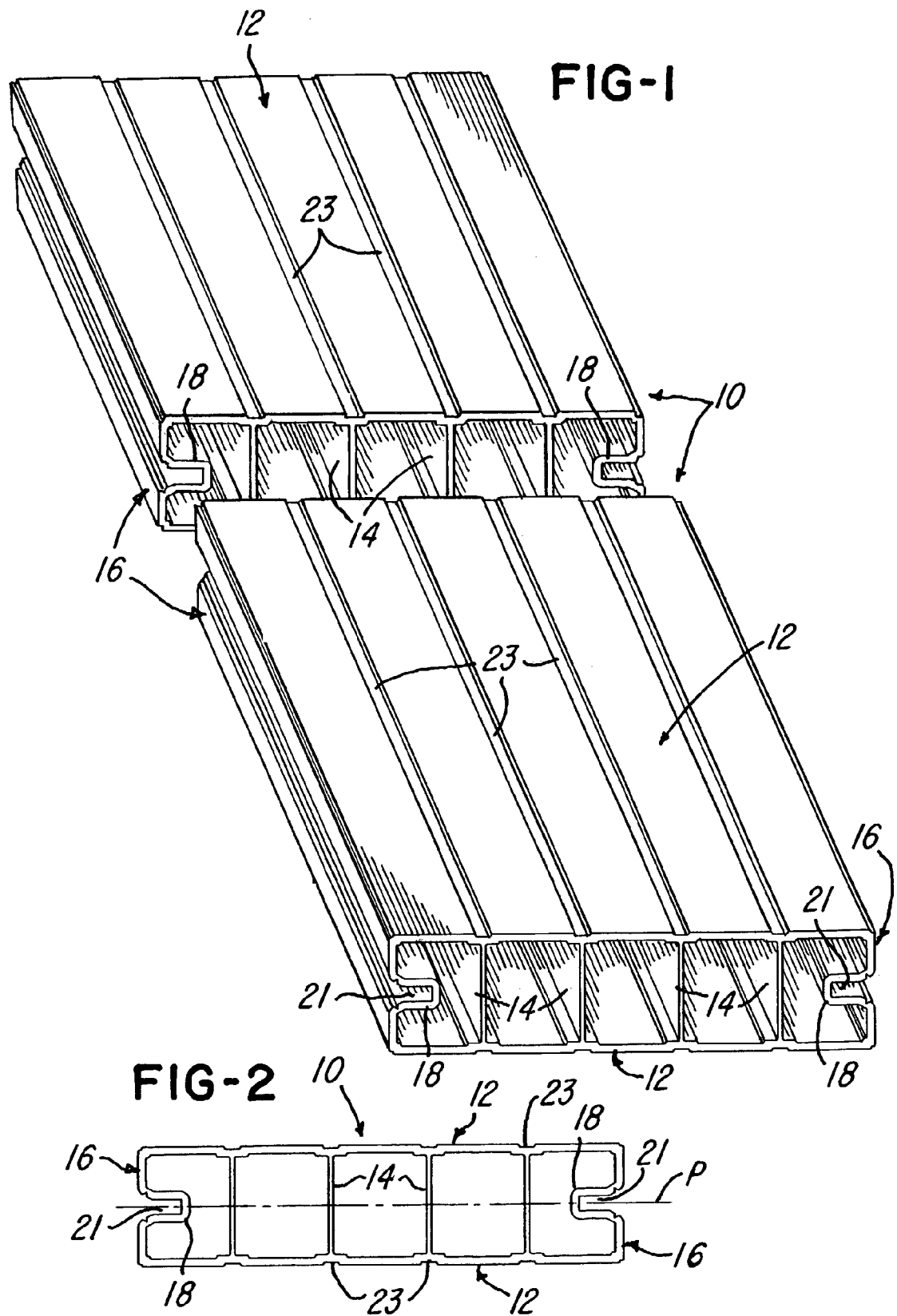

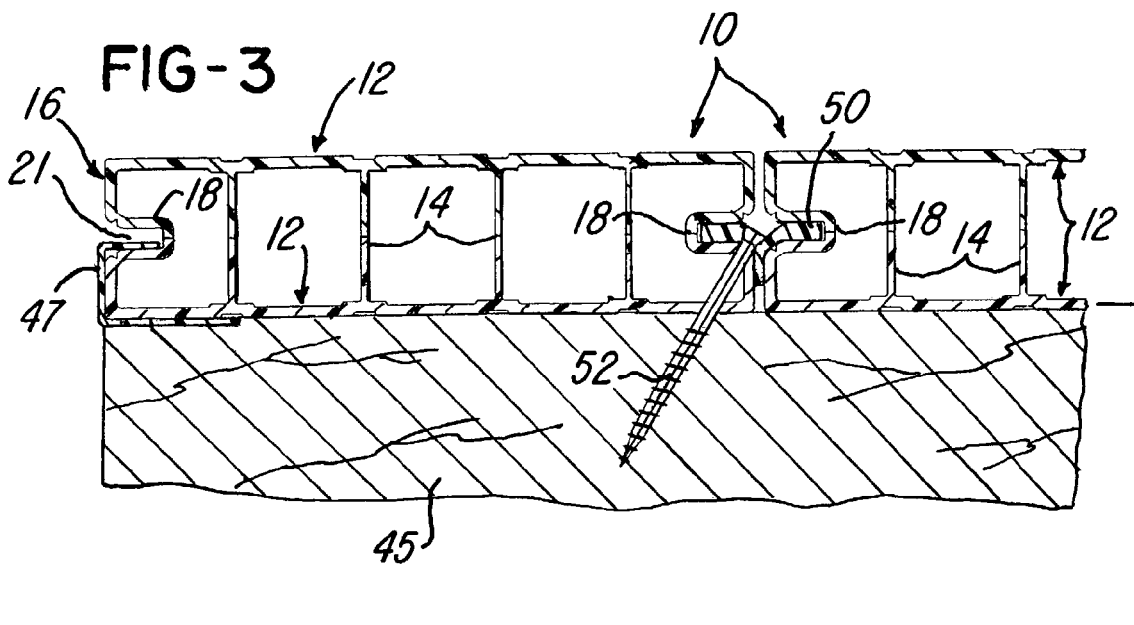
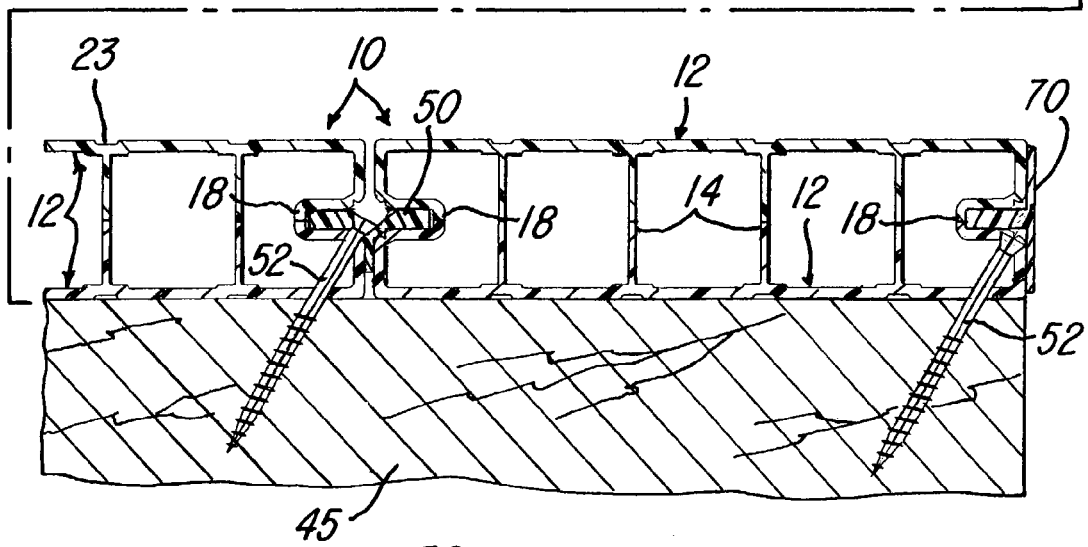
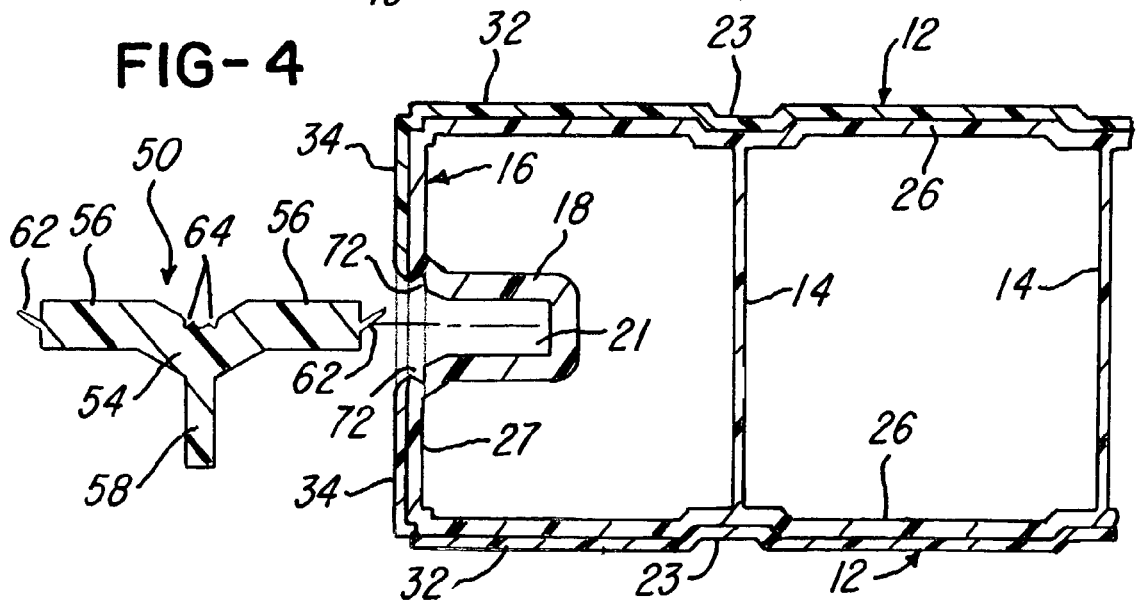

DECK PLANK AND METHOD OF PRODUCTION

BACKGROUND OF THE INVENTION

This invention relates to a deck plank of extruded plastics material and its assembly onto a supporting structure, for example, of the general type disclosed in U.S. Pat. No. 6,301,842 which issued to the Assignee of the present invention. As disclosed in this patent, it is known to extrude deck planks from a plastics material such as polyvinylchloride (PVC) and wherein the base plank is extruded of a less expensive reground or scrap plastics material or PVC, and the top surface is formed by a thin co-extruded capstock layer of more expensive or virgin PVC. The capstock layer provides the top surface with a predetermined durable color and a top pattern surface, for example, a knurl surface with a raised diamond pattern. It has also been found desirable to provide a deck plank which is reversible and with opposite sides having different colors. For example, one side of the deck plank may be gray or off white, and the opposite side may have a color of light brown or a color and texture similar to a treated wood deck plank. It is further desirable to provide for simple and quick assembly of extruded deck planks with hidden fasteners and sometimes with a water-tight seal between adjacent planks so that rain water runs off the ends of the assembled planks.

SUMMARY OF THE INVENTION

The present invention is directed to an improved deck plank of extruded plastics material and which provides all of the desirable features mentioned above. In addition, the deck plank of the invention provides a high strength/weight ratio and substantially reduces a dealers inventory of deck planks since each deck plank is offered with side surfaces in two different colors and may be simply reversed by the customer for selecting between the colors. It is to be understood that the term "deck plank" as used herein includes any plank which is used for supporting people or articles, such as a plank used for making boat docks or for making platforms of all types.

In general, an extruded deck plank constructed in accordance with the invention includes parallel spaced side walls integrally connected by spaced transverse walls which are preferably perpendicular to the side walls. The transverse walls forming opposite edge walls of the deck plank define longitudinally extending slots or grooves within the center of the plank so that the plank is symmetrical about a reference plane extending through the grooves. The side walls of the deck plank are co-extruded with a capstock layer of plastics materials which are supplied from separate extruders to provide the opposite side walls with side surfaces of different colors, thereby permitting the customer or consumer to select between the two colors for the color of the top surface of the deck.

Preferably, the base deck plank is extruded of a less expensive reground scrap material, and the different colored cap layers are extruded of the virgin plastics material with the cap layers extending along the opposite edge walls to the center grooves. When the deck planks are assembled on a supporting frame structure, such as parallel spaced joists, short key or tie pieces or strips project into the opposing grooves of adjacent planks and provide a spacer between the planks. The tie pieces or strips are extruded with flexible fins which provide for a water-tight seal between adjacent deck planks.

Other features and advantages of the invention will be apparent from the following description, the accompanying drawings and the appended claims.

BRIEF DESCRIPTION OF THE DRAWINGS

FIG. 1 is a perspective view of a deck plank constructed in accordance with the invention and with a middle portion removed to illustrate an indefinite length;

FIG. 2 is an end view of the deck plank shown in FIG. 1;

FIG. 3 is a fragmentary section illustrating a plurality of the deck planks shown in FIG. 1 installed on a supporting structure; and FIG. 4 is an enlarged fragmentary section of the deck plank shown in FIGS. 1-3 and with a tie piece or strip exploded therefrom.

DESCRIPTION OF THE PREFERRED EMBODIMENT

FIGS. 1 and 2 illustrate a deck plank 10 which is co-extruded from three different plastics materials, such as PVC materials, and includes a pair of side walls 12 integrally connected by perpendicular transverse walls including intermediate webs or walls 14 and opposite edge walls 16. Each of the edge walls 16 includes a longitudinally extending U-shaped portion 18 defining a corresponding slot or groove 21. The grooves 21 are within the center portions of the edge walls 16 so that the plank 10 is symmetrical about a center reference plane P extending through the center of the grooves 21. As shown in FIGS. 1 and 2, each of the side walls 12 is extruded with parallel spaced traction grooves 23 which are located in longitudinal alignment with the interconnecting intermediate connecting walls 14. The traction grooves 23 also eliminate the appearance of any sink lines in the side walls 12 due to the intermediate walls 14.

Referring to FIG. 4, each of the side walls 12 and the connecting portions of the edge walls 16 down to the grooves 21 have corresponding base layers 26 and 27 which are integrally extruded with the intermediate walls 14 and the U-shaped portions 18 to form a base plank. The base layers 26 and 27 are co-extruded with thinner capstock or cap layers 32 and 34, respectively, and the cap layers 32 and 34 are supplied from separate corresponding extruders which extrude plastics materials or PVC of different colors so that the outer surfaces of the opposite side walls 12 have different colors. For example, cap layers for one side wall 12 and adjoining edge walls 16 may be gray or off white, and the cap layers for the opposite side wall 12 and adjoining edge walls 34 may be tan or clay or a color resembling treated wood. Preferably, the inner base layers 26 and 27, the U-shaped portions 18, and the intermediate walls 14, forming the base plank, are extruded of a less expensive reground scrap material or PVC, and the cap layers 32 and 34 are extruded of a virgin plastics material or PVC. The side walls 12 and the end walls 16 have a total predetermined thickness, for example, between 0.080 and 0.090", and the cap layers 32 and 34 have a thickness of about 0.025".

Referring to FIG. 3, a series of deck planks 10 of a predetermined length, for example 12 feet, are installed on a supporting structure, for example, in the form of parallel spaced wood joists 45. A C-channel strip 47 is first mounted on the joists 45 with suitable fasteners (not shown). The C-channel 47 is preferably formed of extruded plastics material or PVC and may have a height as shown in FIG. 3 to project into a slot 21 of the first deck plank 12. The C-channel may also have a height which covers the entire edge wall 16 of the plank 12 and overlaps the top surface of the top wall 12, thereby covering the slot 21 within the plank. After the first plank 12 is inserted into the C-channel, a retaining piece or strip 50 is inserted into the groove 21 on the opposite edge of the plank. A fastener, for example, in the form of a self-threading screw 52, is inserted on a diagonal through the strip 50 and the corner of the plank and into the each wood joist 45.

As shown in FIG. 4, the retaining strip 50 is preferably extruded from a plastics material such as polypropylene and includes a V-shaped center portion 54, opposite side wing or flange portions 56 and a vertical depending spacer portion 58. Flexible sealing fins 62 are extruded on the outer edges of the flange portions 56, and small V-shaped grooves 64 are extruded in the portion 54 to facilitate starting the self-tapping screws 52. The retaining strips may be in short sections, for example, having a length of 1¾" and are similar to the retaining biscuits disclosed in U.S. Pat. No. 6,402,415. The strips 50 may also be continuous along the entire length of the plank 12. When the strips 50 are continuous and are inserted as shown in FIG. 3, the flexible sealing fin 62 forms a water-tight seal between the strip and the plank. Similarly, when the next adjacent plank 10 is installed, as shown in FIG. 3, the strip forms a water-tight seal with the adjacent plank, and the spacer portion 58 of the strip forms the proper spacing between the adjacent planks. With the water-tight seal between adjacent planks, rain water on the planks flows to the ends of the planks and not through the planks.

When an edge wall 16 is exposed along an edge portion of the deck, for example, at a series of steps, an extruded cover strip 70 (FIG. 3) having a T-shaped cross-sectional configuration, is inserted into the corresponding groove 21 with sufficient interference fit to retain the strip. Prior to inserting the strip, a fastener or self-threading screw 52 is inserted diagonally through the lower portion of the outer plank 10. Small V-shaped grooves 72 are extruded at the entrance of the U-shaped portions 18 of each plank 10 to facilitate starting a diagonal screw 52 when a retaining strip 50 is not required.

From the drawings and the above description, it is apparent that a deck plank constructed in accordance with the present invention and its installation provides desirable features and advantages. For example, the deck plank 10, with its side walls 12 and edge walls 16 co-extruded with capstock layers of different colors, provides the consumer or customer with a selection of one of the two colors for use as the top surface of the deck plank and also reduces the inventory required by a dealer who stocks the deck planks, thereby saving inventory expense. In addition, the grooves 21 in opposite edge walls 16 provide for receiving the hidden fasteners or tie strips 50 which provide for quickly installing the deck planks 10. Furthermore, when continuous tie strips 50 are used between adjacent deck planks, the flexible sealing fins 62 provide for continuous water-tight seal between the adjacent deck planks along the length of the planks so that water does not drain through the planks between the opposing edge walls 16 of adjacent planks and onto objects below. The V-shaped portions 54 of each strip 50 and the guide grooves 64 and 72 provide for convenient and precision installation of the strip 50 with the self threading screws 52.

While the deck plank herein described and its method or construction and assembly constitute a preferred embodiment of the invention, it is to be understood that the invention is not limited to the precise plank and method described, and that changes may be made therein without departing from the scope and spirit of the invention as defined in the appended claims.

What is claimed is:

1. A deck plank assembly comprising an elongated extrusion of rigid plastics material, said extrusion having vertically spaced horizontal opposite side walls integrally connected by horizontally spaced transverse walls, said transverse walls including longitudinally extending opposite edge walls each having a U-shaped wall portion defining a longitudinally extending groove having a horizontal depth substantially greater than its vertical width, each of said U-shaped wall portions having opposing upper and lower beveled surfaces forming a V-shaped entrance for said groove and each of said beveled surfaces having a longitudinally extending V-shaped groove, said deck plank being symmetrical about a center reference plane extending parallel to each said outer side surfaces and through said grooves, a longitudinally extending tie strip extrusion of rigid plastics material and having opposite flange portions projecting horizontally from a center portion, said center portion defining a longitudinally extending and upwardly facing V-shaped recess extending an entire length of said tie strip, said center portion having a downwardly projecting and longitudinally extending spacer rib, said flange portions projecting into opposing said grooves of adjacent said deck planks, and a threaded screw extending diagonally from said V-shaped recess within said tie strip through said center portion of said tie strip and through a bottom corner portion of said plank.

2. A deck plank as defined in claim 1 wherein said flange portions of said tie strip extrusion have a plurality of longitudinally extending and outwardly projecting integral flexible ribs engaging said U-shaped wall portions of said adjacent deck planks.

3. A two color deck plank and tie strip assembly comprising an elongated base extrusion of rigid plastics material, said base extrusion having vertically spaced horizontal opposite side walls integrally connected by horizontally spaced transverse walls, each of said opposite side walls having a cap layer extrusion of plastics material forming an outer side surface, said cap layer extrusion on one of said side walls having a different color than said cap layer extrusion on the opposite said side wall, said transverse walls including longitudinally extending opposite edge walls each having a U-shaped wall portion defining a longitudinally extending groove having a horizontal depth substantially greater than its vertical width, each of said U-shaped wall portions having opposing upper and lower beveled surfaces forming a V-shaped entrance for said groove, said deck plank being symmetrical about a center reference plane extending parallel to each said outer side surfaces and through said grooves to provide for selecting either color on said opposite side walls, a longitudinally extending tie strip extrusion of rigid plastics material and having opposite flange portions projecting horizontally from a center portion, said center portion defining a longitudinally extending and upwardly facing V-shaped recess extending an entire length of said tie strip, said center portion having a downwardly projecting and longitudinally extending spacer rib, said flange portions projecting into opposing said grooves of adjacent said deck planks, and a threaded screw extending diagonally from said V-shaped recess within said tie strip through said center portion of said tie strip and through a bottom corner portion of said plank.

4. A deck plank and tie strip assembly as defined in claim 3 wherein said flange portions of said tie strip extrusion have a plurality of longitudinally extending and outwardly projecting integral flexible ribs engaging said U-shaped wall portions of said adjacent deck planks.

5. A reversible one-piece horizontal deck plank and tie strip assembly adapted to be mounted on parallel spaced horizontal joists, comprising an elongated horizontal base extrusion comprising rigid plastics material and having a horizontal width substantially greater than its vertical height, said base extrusion having vertically spaced horizontal top and bottom walls integrally connected by horizontally spaced transverse walls extending between said top and bottom walls, said top and bottom walls also integrally connected by longitudinally extending and horizontally spaced vertical edge walls, each of said edge walls having a U-shaped wall portion projecting horizontally inwardly toward said transverse walls between said top and bottom walls in vertically spaced relation from both said top and bottom walls, each said U-shaped wall portion defining a longitudinally extending horizontal groove having a horizontal inward depth substantially greater than its vertical height, said horizontal top and bottom walls of said base extrusion each having a cap layer co-extrusion comprising plastics material and forming horizontal top and bottom surfaces for said deck plank, said cap layer co-extrusions on said top and bottom walls continuing vertically to form cap layer co-extrusions on said opposite vertical edge walls and extending substantially to said U-shaped wall portions, said cap layer co-extrusions on said top and bottom walls extending substantially parallel and continuously across the entire horizontal width of said deck plank, and said deck plank being symmetrical about a horizontal reference plane extending parallel to said horizontal top and bottom walls and through said grooves to provide for reversing said deck plank and selecting either of said top and bottom surfaces as said top surface, said tie strip assembly comprising a longitudinally extending elongated tie strip extrusion of rigid plastics material and including longitudinally extending flange portions projecting horizontally in opposite directions from a longitudinally extending V-shaped center portion, said center portion having a vertical spacer portion projecting downwardly between said vertical edge walls of two adjacent said deck planks, said flange portions projecting into opposing said grooves of the adjacent said deck planks, and a screw threaded diagonally through said V-shaped center portion of said tie strip and through a bottom corner portion of said deck plank.

6. A horizontal deck plank as defined in claim 5 wherein said plastics material within said cap layer co-extrusion on said horizontal top wall has a substantially different color than said plastics material within said cap layer co-extrusion on said horizontal bottom wall.

* * * * *